No. 744,393. PATENTED NOV. 17, 1903.
B. G. PALMER.
CUTTING APPARATUS FOR MOWERS, &c.
APPLICATION FILED JAN. 23, 1903.
NO MODEL. 2 SHEETS—SHEET 1.
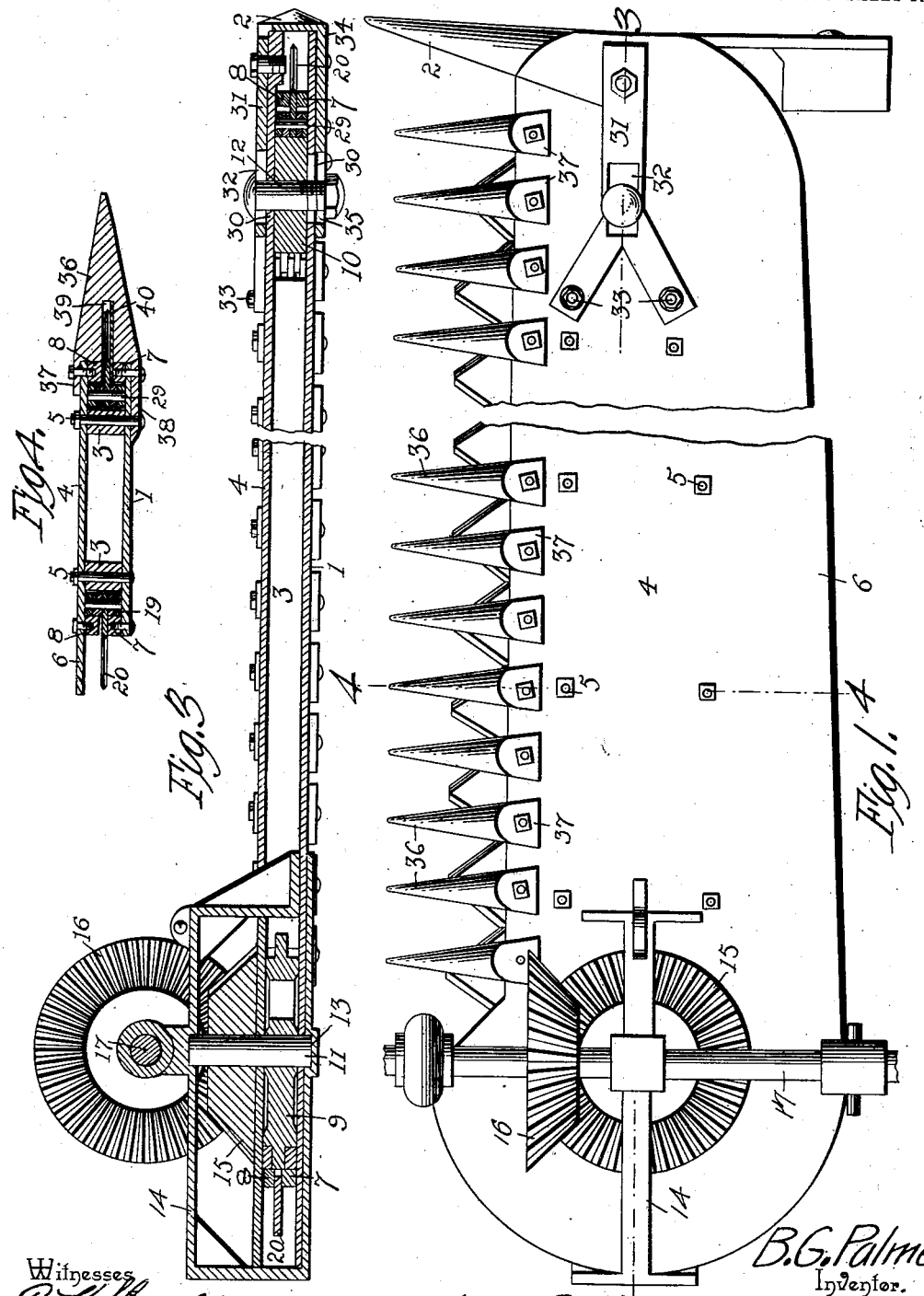

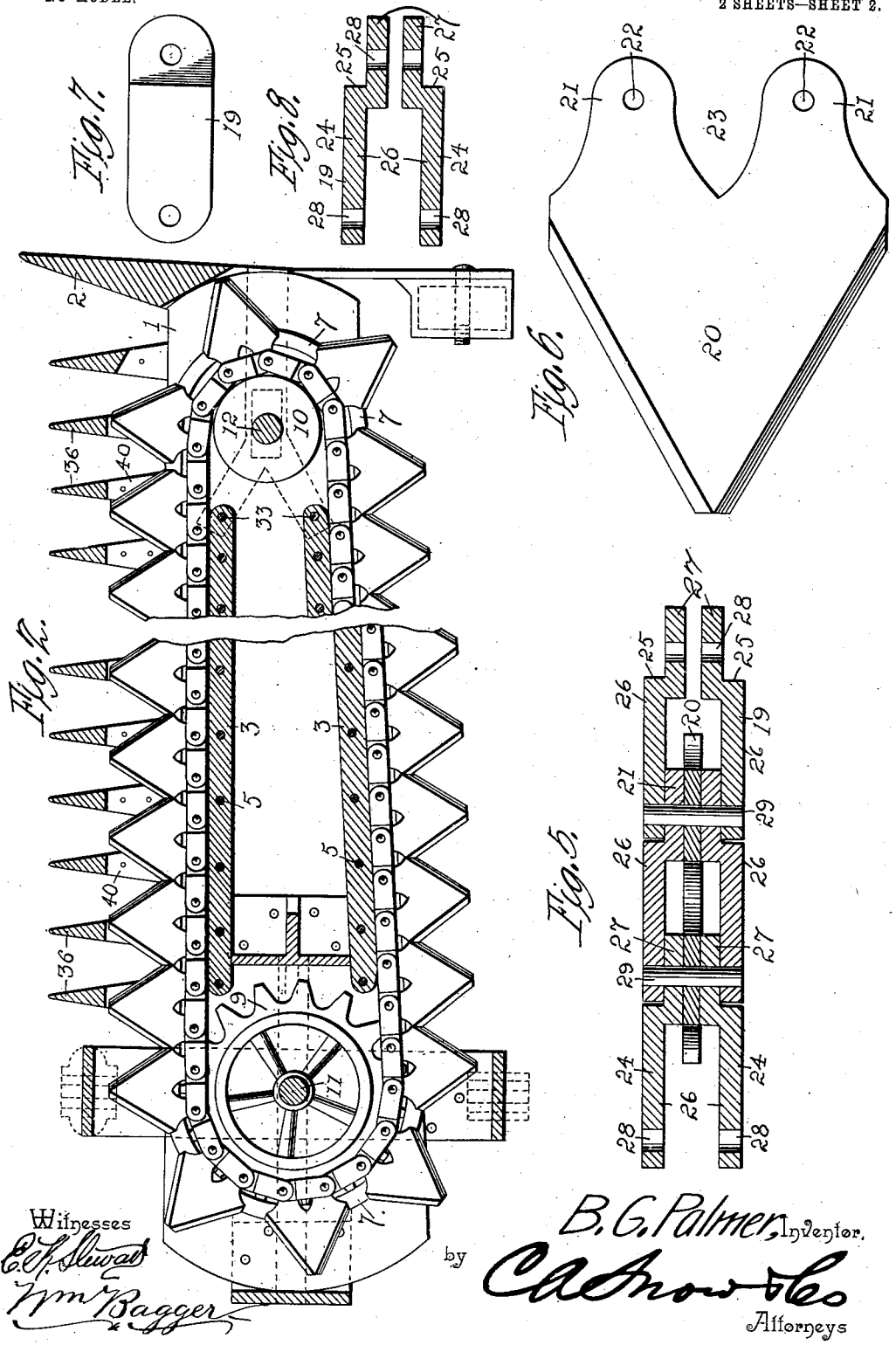

No. 744,393. Patented November 17, 1903.

UNITED STATES PATENT OFFICE.

BYRON G. PALMER, OF WOODLAND PARK, COLORADO, ASSIGNOR OF ONE-HALF TO IRA P. GEORGE, OF COLORADO SPRINGS, COLORADO.

CUTTING APPARATUS FOR MOWERS, &c.

SPECIFICATION forming part of Letters Patent No. 744,393, dated November 17, 1903.

Application filed January 23, 1903. Serial No. 140,282. (No model.)

*To all whom it may concern:*

Be it known that I, BYRON G. PALMER, a citizen of the United States, residing at Woodland Park, in the county of Teller and State of Colorado, have invented a new and useful Cutting Apparatus for Mowers, &c., of which the following is a specification.

This invention relates to cutting apparatus for mowers, harvesters, and the like; and it has for its object to provide an endless cutting apparatus comprising blades or cutters flexibly connected by means of the links of an endless chain which shall possess superior advantages in point of simplicity, durability, and general efficiency.

With these ends in view the invention consists in the improved construction, arrangement, and combination of parts, which will be hereinafter fully described, and particularly pointed out in the claims.

In the accompanying drawings, Figure 1 is a plan view showing the cutting apparatus constructed in accordance with the principles of my present invention. Fig. 2 is a plan view of the same, partly in section and with the covering-plate removed. Fig. 3 is a longitudinal sectional view taken on the line 3 3 in Fig. 1. Fig. 4 is a transverse sectional view taken on the line 4 4 in Fig. 1. Fig. 5 is a longitudinal sectional view showing several of the links connected with one of the blades or cutters in position. Fig. 6 is a plan view of one of said blades or cutters. Fig. 7 is a plan view of one of the chain-links. Fig. 8 is a sectional view taken longitudinally through the members of one of the chain-links.

Corresponding parts in the several views are indicated by similar characters of reference.

The cutter-bar or sickle-bar 1, which is supported or carried by the machine of which it forms a part in the usual manner, carries at its outer end the drag-shoe 2, which is also of ordinary construction. Said sickle-bar is provided upon its upper side with bars or ribs 3, extending longitudinally and parallel to the front and rear edges thereof, said flanges serving to support the top plate or cover 4, which is connected with the said sickle-bar by means of bolts 5, extending to the flanges 3 at suitable intervals. The top plate or cover 4 has a rearward extension 6, (shown clearly in Fig. 4 of the drawings,) the object of which is to serve as a guard for the blades of the cutting apparatus on the rearward pass of the same.

The sickle-bar 1 and top plate 4 are provided upon their meeting or opposing faces with flanges 7 and 8, forming tracks or guides for the endless chain of cutters. The latter is mounted upon a sprocket-wheel 9 near the inner end of the cutter-bar and upon a pulley 10 near the outer end of the same, as will be clearly seen in Fig. 2 of the drawings, both of said wheels being provided with shafts 11 and 12, having their bearings in the top and bottom of the casing, which has been described as consisting of the members 1 and 4. Instead of a shaft the pulley 10 may be journaled upon a bolt, which then has the additional function of serving to secure the parts of the device more firmly together. This is the construction illustrated in the drawings.

At the inner end of the sickle-bar 1 is formed a socket 13, which supports a shaft 11, carrying the sprocket-wheel 9. At this end of the casing is also formed a suitable bearing 14 for the upper end of shaft 11, which also carries a bevel-gear 15, meshing with a pinion 16, the shaft of which, 17, has a suitable support or bearing upon the casing. The construction of these parts of the device is conventional and may be modified to any extent within the scope of my invention.

The endless chain of cutters which in connection with the finger-bars constitutes my improved cutting apparatus is composed of the links 19 and the blades or cutters 20. The latter are of the usual triangular shape, and they are provided at their rear edges with rearwardly-extending tongues 21, having perforations 22. The space 23 between said tongues is of such a size and shape as to be properly engaged by the teeth of the sprocket-wheel 9. The outer edges of said tongues 21 are also so proportioned that when a pair of blades are placed together, as when connected by the link members of the chain, they shall flexibly engage the said sprocket-wheel. The front edges of the cutters are beveled in the usual manner to form cutting edges. Each of the links is composed of two members 24, oblong in shape and formed with shoulders 25, whereby each member is divided into two separate sections 26 and 27, lying in different planes, the sections 27 being more closely together and the difference in the disposition of said planes being equal to the thickness of each link member. Each link member is provided near its ends with vertical perforations 28 to receive the connecting-pins 29, whereby they and the cutters or blades 20 are connected together. The relative disposition of the parts when connected will be readily understood by reference to Fig. 5 of the drawings, where it will be seen that the link members 24 of each link are disposed with their dropped or shouldered ends 27 interposed between the ends 26 of the members of the adjacent link, the ends 27 of the respective link members being spaced apart by the tongues 21 of the blades which are interposed, as clearly shown, the several parts being connected by the pins 29, which are simply dropped through the perforations 28 in the link members and 22 of the blades, which are disposed in alinement with each other. The various parts are of course so proportioned that the adjacent edges of the blades shall lie snugly together when the cutting apparatus is in operation, and on the rearward pass while passing over the sprocket-wheel and the supporting-pulley the blades will of course separate, as will be seen in Fig. 2.

Tension upon the cutting apparatus may be regulated by mounting the bolt 12, which forms the shaft or axle of the supporting-pulley in slots 30 at the outer end of the casing formed by the sickle-bar 1 and cover 4. A Y-shaped bar 31, bolted on top of the cover, is likewise provided with a slot 32 for the passage of said bolt or shaft, the arms of said Y being secured to the casing by means of bolts 33, so disposed as to pass through the outer ends of the guide-flanges 3. The extreme outer end of the sickle-bar may be reinforced by a bottom plate 34, which is also slotted, as at 35, for the passage of the shaft of bolt 12 and which may form a part of or be connected with the drag-shoe 2.

The tracks or guides 7 and 8, hereinbefore referred to, are disposed at the front and rear edges of the sickle-bar 1 and at the front edge of the top plate or cover 4. The rear part of the track 8 upon the said cover-plate is disposed at a distance from the rear edge of said plate, so as to be in alinement with the corresponding part of the track 7 upon the sickle-bar. The ends of said tracks 7 and 8 are curved concentrically, with the sprocket-wheel 9 and pulley 10 at a proper distance from the same. These tracks or track members serve to support between them the blades or cutters 20 and to prevent displacement in an outward direction of the endless chain, of which said blades form members. Displacement in an inward direction is equally prevented by the flanges 3, rising from the sickle-bar 1, the link members of the endless chain being confined between said flanges 3 and track members 7 and 8, as will be seen most clearly by reference to Fig. 4 of the drawings. The rearward extension 6 of the top plate 4 serves as a guard for the blades or cutters on the rearward pass of the chain, as will be readily understood.

The guard-fingers 36 of my improved cutting apparatus are in the main of the usual construction, being provided with rearward extensions 37 38 on their upper and under sides, respectively, and having horizontal recesses 39, in which are secured steel plates 40, coacting with the blades or cutters 20, which are adapted to pass through the said recesses 39 in contact with the said plates 40 and exercise a shearing action in connection with the latter. The bolts or fastening members, which are used for connecting the fingers with the casing of the cutting apparatus, may extend into the track members 7 and 8 and through the flange members 3, which are thus additionally secured. The detailed construction of these parts, however, and the method of assembling the same may be modified to any extent within the scope of my invention.

From the foregoing description, taken in connection with the drawings hereto annexed, the operation and advantages of my invention will be readily understood. Motion may be supplied in any suitable manner to the shaft 17, carrying the pinion 16, from which it is transmitted to the bevel-gear 15 upon the shaft 11, which also carries the sprocket-wheel 9, whereby the endless chain of cutters is operated. By this device the vibration of the reciprocating sickle-bar is avoided, and the operation of cutting grass, grain, or the like is much facilitated.

I desire it to be understood that I do not limit myself to the precise structural details herein described, but reserve to myself the right to any changes and modifications which may be resorted to without sacrificing the utility or departing from the spirit and scope of my invention.

Having thus fully described my invention, what I claim is—

1. In a device of the class described, the endless chain composed of links and blades, said links being composed each of two members having dropped or shouldered sections interposed between the sections of the adjacent link members which are disposed in planes farther apart, the former sections of the link members being spaced apart by the cutter-blades and connected with each other, with said blades and with the adjacent link-sections by means of pins extending through perforations in the said parts.

2. In an endless cutting apparatus for harvesters, a chain composed of blades having rearward-extending tongues and links each composed of two members spaced apart by said blades and having sections directly contacting with the upper and lower sides of said blades and extended sections embracing, and engaging the outer sides of said contacting sections, and pins connecting the several parts.

In testimony that I claim the foregoing as my own I have hereto affixed my signature in the presence of two witnesses.

BYRON G. PALMER.

Witnesses:
   JOE A. HETHERINGTON,
   CHARLES WELLBROCK.